United States Patent [19]

Fleischer et al.

[11] Patent Number: 5,416,152
[45] Date of Patent: May 16, 1995

[54] POLYACETAL MOLDING COMPOSITIONS AND THEIR USE

[75] Inventors: Dietrich Fleischer, Darmstadt; Andreas Kirst, Frankfurt am Main; Klaus Kohlhepp, Eppstein/Taunus; Hans-Dieter Sabel, Königstein/Taunus, all of Germany

[73] Assignee: Hoechst Aktiengesellschaft, Frankfurt am Main, Germany

[21] Appl. No.: 988,720

[22] Filed: Dec. 10, 1992

[30] Foreign Application Priority Data

Dec. 12, 1991 [DE] Germany .............. 41 40 898.5

[51] Int. Cl.$^6$ .................................. C08K 5/00
[52] U.S. Cl. .......................... 524/487; 524/275; 524/277; 524/488
[58] Field of Search ............... 524/315, 275, 277, 487, 524/488

[56] References Cited

U.S. PATENT DOCUMENTS

| | | | |
|---|---|---|---|
| 4,391,741 | 7/1983 | Massamoto et al. | 252/511 |
| 4,695,609 | 9/1987 | Stevenson et al. | 525/352 |
| 4,873,282 | 10/1989 | Yui et al. | 524/496 |
| 5,173,532 | 12/1992 | Endo et al. | 524/425 |
| 5,254,635 | 10/1993 | Stevenson et al. | 525/332.7 |
| 5,326,828 | 7/1994 | Rowland et al. | 525/346 |

FOREIGN PATENT DOCUMENTS

| | | |
|---|---|---|
| 0110108 | 6/1984 | European Pat. Off. |
| 0172691 | 2/1986 | European Pat. Off. |
| 0340931 | 11/1989 | European Pat. Off. |
| 0372681 | 6/1990 | European Pat. Off. |
| 0430215 | 6/1991 | European Pat. Off. |

OTHER PUBLICATIONS

T. L. Jablonowski, "Tetrabenzylthiuram disulfide and N-cyclohexylbis-(2-benzothiazolesulfen)amide as Alternative Accelerators to Reduce the Generation of Hazardous Nitrosamines", Paper No. 41, Presented at ACS Rubber Div. Meeting, Oct. 8-11, 1991.
Derwent Abstract, JP 63 175 069 (Jul. 19, 1988).

*Primary Examiner*—Edward Cain
*Attorney, Agent, or Firm*—Connolly and Hutz

[57] ABSTRACT

A polyacetal molding composition comprising, as the active additive, at least one a) ester of long-chain monocarboxylic acids ($C_{22}$ to $C_{34}$) with mono- or polyhydric alcohols ($C_2$ to $C_8$), in the presence or absence of alkali metal and/or alkaline earth metal salts of the carboxylic acids mentioned, and/or b) polyethylene wax, is distinguished by a reduced tendency toward melt fracture. Such molding compositions can advantageously be employed in the production of shaped articles which show no undesirable defects in the surface.

5 Claims, No Drawings

POLYACETAL MOLDING COMPOSITIONS AND THEIR USE

DESCRIPTION

Polyacetal molding compositions and their use

The invention relates to polyacetal molding compositions which have a reduced tendency toward melt fracture, and their use.

Polyacetals have acquired a firm place among industrial plastics, both because of their properties and because of their problem-free processing.

Polyacetals can be processed by all the processes customary for thermoplastics; injection molding and extrusion are used quite predominantly in practice.

In spite of the processing range mentioned, there is often the task of influencing certain properties of the polyacetal melts, for example their critical shear rate, in a controlled manner in order to open up new fields of use for the polyacetals or to improve the productivity in existing fields of use.

It is known that in the case of both injection molding and extrusion processing, surface defects on the moldings can occur as a result of melt fracture. The reason for the melt fracture is an inconstancy in the flow characteristics above a certain shear rate, the so-called critical shear rate.

In principle, melt fracture depends on the viscosity of the melt and on the chemical structure of the polymer, and is a function of the dynamic modulus of elasticity of the melt.

Avoiding melt fracture requires a reduction in the melt elasticity, i.e. an increase in the critical shear rate.

Additives to achieve the desired influencing of the flow properties of polyacetal melts are known in general; examples which may be mentioned are calcium stearate, zinc stearate and bis-(N,N'-stearoyl)-ethylenediamine. In order to achieve an adequate activity, however, the systems known to date require relatively high use concentrations, and in general, for example, 0.2% by weight of the additives mentioned is used. However, even this amount is still not sufficient for some fields of use.

If attempts are now made to shift the critical shear rate to higher values by an increased concentration of the compounds mentioned, this is associated with the following disadvantages:
deterioration of the intake properties in the extruder/injection molding machine
risk of the formation of a mold deposit ("plate out")
reduction in the throughput of the processing machine
possible weakness of the weld line of injection-molded moldings.

The object of the invention was thus to develop molding compositions of polyacetals and additives in which the additives are active in respect of the desired reduction of the melt elasticity in significantly lower concentrations, and in which the disadvantages mentioned do not occur.

The invention therefore relates to a polyacetal molding composition which comprises at least one additive, comprising, as the active additive, at least one a) ester of long-chain monocarboxylic acids ($C_{22}$ to $C_{34}$) with mono- or polyhydric alcohols ($C_2$ to $C_8$), in the presence or absence of alkali metal and/or alkaline earth metal salts of the carboxylic acids mentioned, or b) polyethylene wax, or a mixture of a) and b).

The polymers used are characterized by recurring oxymethylene groups. The term polyoxymethylene includes all polymers comprising more than 50% of the recurring units —($CH_2O$)—, such as polyoxymethylene homopolymer, polyoxymethylene copolymer, polyoxymethylene terpolymer and the like. The polyoxymethylene can comprise stabilizers, including formaldehyde-trapping agents, antioxidants, light stabilizers, antistatics, colors, pigments, carbon black, other fillers, impact modifiers, such as thermoplastic polyurethanes, methyl methacrylate/butadiene/styrene graft copolymers or acrylonitrile/butadiene/styrene graft copolymers, reinforcing agents and the like. Copolymers of trioxane and 0.7 or 2% of ethylene oxide, which in each case have an MFI value 190/2.16 of 13 g/10 minutes or, respectively, 2.5 g/10 minutes, are preferably employed.

The additives according to the invention are esters of aliphatic monocarboxylic acids having 22 to 34, preferably 28 to 32 carbon atoms and mono- or polyhydric alcohols having 2 to 8, preferably 3 to 6 carbon atoms, such as 1,4-butylene glycol or glycerol, if appropriate mixed with alkali metal and alkaline earth metal salts of the carboxylic acids mentioned, such as sodium, potassium, magnesium or, preferably, calcium salts.

A product which is known as Hoechst-Wachs OP (manufacturer: Hoechst AG, Federal Republic of Germany), which is a mixture of montanic acid butylene glycol ester and calcium montanate, is particularly preferred because, as well as reducing the melt elasticity according to the invention, at the same time it is an effective mold release aid during injection molding processing, and moreover has a stabilizing action on the polymer melt—regardless of the processing method.

The PE waxes according to the invention are ethylene polymers of high or low density having molecular weights of 3000 to 9000 in the case of high density polymers or 2000 in the case of low density polymers. They can carry minor contents of polar groups, such as free carboxyl groups and/or esters thereof, and are distinguished by the fact that they have an acid number, measured in accordance with DIN 53402, of up to 35 mg of KOH/g and/or a hydrolysis number, measured in accordance with DIN 53401, of up to 50 mg of KOH/g.

The active additives are added in an amount of 0.003 to 0.15, preferably 0.01 to 0.12, in particular 0.02 to 0.10% by weight, based on the weight of the total polyacetal molding composition.

The molding compositions according to the invention can comprise other customary additives, such as fillers, reinforcing agents and antistatics.

Measurement method for the shear rate/shear stress graph (flow curve)

The shear rate is not measured directly, but is calculated from the test conditions, rheological data and die geometry. The investigations were carried out using a high pressure capillary viscometer (HCV) of the Rheograph 2001 type from Göttfert (Buchen, Federal Republic of Germany), with a 10:1 perforated die. The shear rate was set and varied by changing the throughput of the polymer melt by applying different weights. A certain pressure, which was read off and from which the shear stress was calculated, was established each time. The resulting graph is the flow curve.

Definition of the critical shear rate

The critical shear rate can be defined and therefore also determined by two different methods:
on the one hand, the shear rate at which the shear rate plotted against the shear stress in the flow curve shows a jump (inconstancy) is called the critical shear rate;
on the other hand, the appearance of the extrudate strand emerging from an HCV can be observed: below the critical shear rate, its surface is smooth, while above the critical shear rate, the surface is rough; i.e. the occurrence of surface roughness for the first time at an increasing shear rate (=increasing throughput) indicates that the critical shear rate has been reached.

Swell rate

The swell rate (die swell) $\delta D$ indicates by how much the diameter of the extrudate strand is greater than the diameter of the die bore after leaving the die:

$$\delta D[\%] = \frac{\text{Diameter of the extrudate} - \text{Diameter of the die}}{\text{Diameter of the die}} \times 100$$

The molding compositions according to the invention can always advantageously be used if it is necessary to increase the critical shear rate to avoid undesirable disturbances in the surface of moldings.

During extrusion processing, for example to give vacuum-calibrated profiles, molding compositions according to the invention give shaped articles which have perfectly smooth surfaces both on the inside and on the outside under conditions under which conventional molding compositions exhibit melt fracture and consequently rough surfaces. Similarly, it has been found that no "plate out" occurred with the compositions according to the invention during calendering of the polymer melt, and smooth calendered sheets thus result.

The molding compositions according to the invention can advantageously be used in injection molding processing to give shaped articles having a large surface area in relation to their weight, in particular to give container-like moldings, such as cigarette lighter bodies or aerosol containers.

EXAMPLES

The following waxes were used in the examples:

| | |
|---|---|
| Ca stearate | Ca(C$_{17}$H$_{35}$COO)$_2$ |
| Wax 1 | Mixture of the ester of butylene glycol with montanic acid and Ca montanate; dropping point according to DIN 51801 98 to 104° C., acid number according to DIN 53402 10 to 15 mg of KOH/g, hydrolysis number according to DIN 53402 100 to 120 mg of KOH/g, density according to DIN 53479 1.01 to 1.03 g/cm$^3$ |
| Wax 2 | Ester of ethylene glycol and montanic acid; dropping point according to DIN 51801 79 to 85° C., acid number according to DIN 53402 15 to 20 mg of KOH/g, hydrolysis number according to DIN 53401 130 to 160 mg of KOH/g, density according to DIN 53479 1.01 to 1.03 g/cm$^3$ |
| Wax 3 | Ester of glycerol with montanic acid; dropping point $\approx$ 80° C., acid number $\approx$ 25 mg of KOH/g, hydrolysis number $\approx$ 240 mg of KOH/g, density $\approx$ 1.01 g/cm$^3$ |
| Wax 4 | Polyethylene having a density of 0.97 g/cm$^3$ and a viscosity of 300 mPas at 140° C., measured in accordance with DIN 51562 |
| Wax 5 | Polar polyethylene having a density of 0.98 g/cm$^3$, a viscosity, measured at 140° C. in accordance with DIN 51562, of 1500 mPas, an acid number, measured in accordance with DIN 53402, of 25 mg of KOH/g and a hydrolysis number, measured in accordance with DIN 53401, of 40 mg of KOH/g |
| Wax 6 | Polar polyethylene having a density of 0.97 g/cm$^3$, a viscosity, measured at 140° C. in accordance with DIN 51562, of 4000 mPas, an acid number, measured in accordance with DIN 53402, of 15 mg of KOH/g and a hydrolysis number, measured in accordance with DIN 53401, of 28 mg of KOH/g |

1. In a high pressure capillary viscometer (Rheograph from Göttfert), a copolymer of trioxane and 2% of ethylene oxide having a melt flow index MFI 190/2.16 of 2.5 g/10 minutes was extruded, with the additives shown in Table 1, through a die with an L/D ratio of 40 at a test temperature of 195° C. and at an increasing shear rate. The emerging extrudates were inspected visually for the start of surface roughness, i.e. the start of melt fracture, which thus indicates that the critical shear rate has been reached.

TABLE 1

| | no wax | with 0.05% by weight of wax 1 |
|---|---|---|
| critical shear rate | 1126 s$^{-1}$ | 2299 s$^{-1}$ |

The critical shear rate could be more than doubled by addition of only 0.05% by weight of wax.

2. The trioxane/ethylene oxide copolymer described in Example 1 was extruded with the additives mentioned in Table 2 at an output of 14 kg/hour (screw speed 40 minute$^{-1}$) to give vacuum-calibrated profiles. The swell rate and the pressures in the die were measured, and the appearance of the melt and the surface of the extrudates were evaluated:

TABLE 2

| Additive [% by weight] | Swell rate [$\delta D$ in %] | Pressure [bar] | Melt | Surface |
|---|---|---|---|---|
| — | 13 | 313 | cloudy | rough |
| 0.3 of Ca stearate (comparison) | 11 | 285 | transparent | smooth |
| 0.07 of wax 1 | 10 | 268 | transparent | smooth |

While 0.3% by weight of Ca stearate was previously necessary in order to achieve the desired results, an even more favorable result is achieved with only 0.07% by weight of wax 1. The swell rate is the percentage increase in the diameter of the extrudate after leaving the die.

3. The trioxane/ethylene oxide copolymer from Example 1 was extruded with varying amounts of wax 4, as in Example 2, to give vacuum-extruded profiles, the screw speed being set at 24 minutes$^{-1}$.

TABLE 3

| Concentration of wax 4 [% by weight] | Pressure [bar] | Extrudate surface internal | Extrudate surface external |
|---|---|---|---|
| — | 262 | rough | smooth |
| 0.0125 | 255 | slightly rough | smooth |
| 0.025 | 246 | smooth | smooth |
| 0.05 | 230 | smooth | smooth |
| 0.1 | 200 | smooth | slightly rough |
| 0.2 | <180 | smooth | rough |

Shaped articles of good quality could be produced with only 0.025 to 0.05% by weight of PE wax. A concentration of less than 0.003% by weight proved to be inactive, and overdosing led to poor conveying properties, as with known waxes.

4. The trioxane/ethylene oxide copolymer from Example 1 was extruded with in each case 0.1% by weight of various additives to give vacuum-extruded profiles, the pressure which thereby occurred being measured; furthermore, the same copolymer containing 0.2% by weight of bis-(N,N'-stearoyl)ethylenediamine as a standard, was extruded in the same manner; compared with this standard, the materials containing additives according to the invention show the following pressure differences:

TABLE 4

| Additive | Pressure difference [bar] |
|---|---|
| Ca stearate | 22 |
| Wax 1 | 54 |
| Wax 5 | 80 |
| Wax 3 | 111 |
| Wax 2 | 112 |
| Wax 6 | 130 |

Ca stearate is the least active, and all the other waxes cause significantly greater pressure reductions. In Example 2, Ca stearate and wax 1 have a similar action, but at different concentrations: 0.3/0.07% by weight, instead of 0.1/0.1% by weight here.

5. A trioxane copolymer with 0.7% by weight of ethylene oxide as the comonomer and having a melt flow index MFI 190/2.16 of 13 g/10 minutes was investigated in the same manner as in Example 1, without additives and as a mixture with 0.05% by weight of wax 1:

TABLE 5

| | no wax | with 0.05% by weight of wax 1 |
|---|---|---|
| critical shear rate | 3813 s$^{-1}$ | 7012 s$^{-1}$ |

In this case also, addition of only 0.05% by weight of the wax mixture causes a significant rise in the critical shear rate. Both materials were injection molded to cigarette lighter bodies; in the case of the wax-containing material, the surfaces were free from craters.

6. Three products with different contents, according to the following Table 6, were prepared from the copolymer according to Example 1:

TABLE 6

| No. | Additive |
|---|---|
| 1 | none |
| 2 | 0.1% by weight of bis-(N,N'-stearoyl)-ethylenediamine |
| 3 | 0.2% by weight of bis-(N,N'-stearoyl)-ethylenediamine |
| 4 | 0.05% by weight of wax 1 |

All four materials were processed by the extrusion process and subsequent calendering to give sheets 2 mm thick. The processing conditions were the same in all cases. Visual evaluation of the sheets produced gave the following assessment:

No. 1 Uneven surface with craters and pits which are to be attributed to melt fracture.

No. 2 Better surface than in the case of No. 1, but still uneven.

No. 3 Surface which is not completely free from defects.

No. 4 Perfect surface without craters and pits.

The melt fracture and therefore the surface quality accordingly can be influenced in the desired sense by addition of wax. However, while 0.2% by weight of wax is required for No. 3, an even better result is achieved in No. 4 with only 0.05% by weight.

We claim:

1. A polyacetal molding composition containing 0.003 to 0.05% by weight, based on weight of molding composition, of polyethylene wax.

2. A polyacetal molding composition as claimed in claim 1, in which the polyacetal originates from polyoxymethylene or is a polyoxymethylene copolymer.

3. A polyacetal molding composition as claimed in claim 1, which contains other customary additives in the form of stabilizers, fillers, impact modifiers, reinforcing agents and/or antistatics.

4. A shaped article produced from a polyacetal molding composition as claimed in claim 1.

5. A cigarette lighter body, aerosol container, calendared sheet or vacuum-calibrated profile as a shaped article as claimed in claim 4.

* * * * *